United States Patent
Tamaki et al.

(10) Patent No.: US 7,916,602 B2
(45) Date of Patent: *Mar. 29, 2011

(54) OPTICAL RECORDING AND REPRODUCING APPARATUS AND OPTICAL RECORDING AND REPRODUCING METHOD

(75) Inventors: Tatsuya Tamaki, Tokyo (JP); Jumpei Kura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,952

(22) Filed: Dec. 15, 2009

(65) Prior Publication Data

US 2010/0149941 A1 Jun. 17, 2010

Related U.S. Application Data

(63) Continuation of application No. 11/705,302, filed on Feb. 12, 2007, now Pat. No. 7,715,294.

(30) Foreign Application Priority Data

Feb. 24, 2006 (JP) ................................ 2006-049233

(51) Int. Cl.
*G11B 7/0045* (2006.01)
(52) U.S. Cl. ................... 369/59.11; 369/59.12
(58) Field of Classification Search ............... 369/59.11
See application file for complete search history.

(56) References Cited

U.S. PATENT DOCUMENTS

| 6,628,595 | B1 | 9/2003 | Sasa et al. |
| 7,715,294 | B2 * | 5/2010 | Tamaki et al. ............ 369/59.12 |
| 2003/0142606 | A1 | 7/2003 | Ogawa et al. |

FOREIGN PATENT DOCUMENTS

| JP | 2003-030837 A | 1/2003 |
| JP | 2004-185796 A | 7/2004 |
| JP | 2004-335079 A | 11/2004 |
| JP | 2004-355727 A | 12/2004 |
| JP | 3674160 B2 | 7/2005 |
| JP | 2006-285260 A | 10/2006 |
| JP | 2007-172804 A | 7/2007 |

* cited by examiner

*Primary Examiner* — Joseph Haley
*Assistant Examiner* — Nicholas Lee
(74) *Attorney, Agent, or Firm* — Wolf, Greenfield & Sacks, P.C.

(57) ABSTRACT

An optical recording and reproducing apparatus includes a recording-pulse-shift setting unit that shifts a front edge and a rear edge of a recording pulse and sets a write strategy of the recording pulse, a mark-edge-position evaluating unit that detects a front edge and a rear edge of a mark formed and detects a front mark edge position error and a rear mark edge position error, an assuming unit that assumes that the front mark edge position error is represented by a first linear function and assumes that the rear mark edge position error is represented by a second linear function, a sensitivity calculating unit that executes test recording and calculates sensitivities, and a write-strategy calculating unit that calculates a write strategy of the recording pulse on the basis of the sensitivities.

1 Claim, 8 Drawing Sheets

T: CHANNEL CLOCK PERIOD

☐ INITIAL WRITE STRATEGY
◇ THREE KINDS OF TEST RECORDING
○ OPTIMUM WRITE STRATEGY

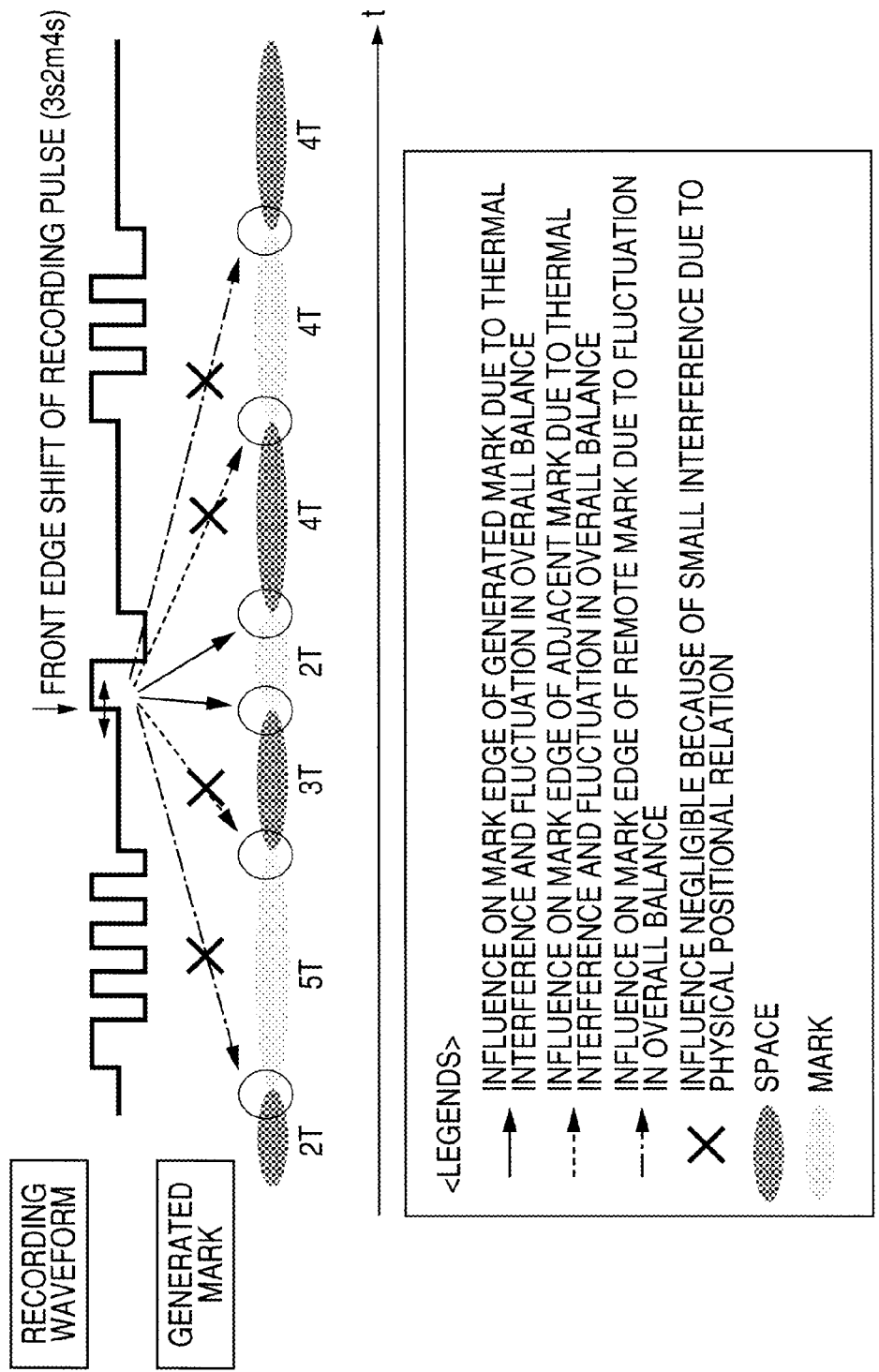

FIG. 7A

EXAMPLE OF MATRIX EQUATION (FULL RESPONSE TYPE CORRECTION): TEST RECORDING WITH NINETEEN WAYS OF STRATEGIES

UNKNOWN NUMBER: 18×18+18+18=342

FIG. 7B

EXAMPLE OF MATRIX EQUATION (LOCAL RESPONSE TYPE CORRECTION):
TEST RECORDING WITH THREE WAYS OF STRATEGIES

UNKNOWN NUMBER: $18 \times 2 + 18 = 54$

EXAMPLE OF MATRIX EQUATION (FULL RESPONSE TYPE CORRECTION, INTERFERENCE BETWEEN 3m AND 4m IS ALSO TAKEN INTO ACCOUNT): TEST RECORDING WITH NINETEEN WAYS OF STRATEGIES

UNKNOWN NUMBER: $36 \times 36 + 36 = 1332$

US 7,916,602 B2

OPTICAL RECORDING AND REPRODUCING APPARATUS AND OPTICAL RECORDING AND REPRODUCING METHOD

CROSS-REFERENCES TO RELATED APPLICATIONS

This application is a continuation of U.S. application Ser. No. 11/705,302, filed Feb. 12, 2007, which in turn, contains subject matter related to Japanese Patent Application JP 2006-049233 filed in the Japanese Patent Office on Feb. 24, 2006, the entire contents of which being incorporated herein by reference.

BACKGROUND OF THE INVENTION

1. Field of the Invention

The present invention relates to an optical recording and reproducing apparatus and an optical recording and reproducing method.

2. Description of the Related Art

When a mark is recorded at high speed in an optical recording medium in which high-density recording is possible such as a digital video disk, heat in an end portion of the mark recorded may be conducted through a space portion continuing to the end portion and affect an increase in temperature of in a beginning portion of a mark to be formed next. The heat may be conducted from a beginning portion of the mark recorded through a space portion continuing to the beginning portion and affect a cooling process of the end portion of the mark already recorded. Such an influence on a mark formation process due to heat conduction is called thermal interference. In particular, when a space length immediately in front of or immediately behind the mark recorded is small, the heat interference is conspicuous.

When the thermal interference occurs, an edge position of the mark fluctuates and an error ratio increases when information is reproduced. Thus, in the past, it is considered that a method of controlling a laser adapted to an optical recording medium to be used is necessary in order to realize high-speed recording in the optical recording medium.

To solve the problem and record information in the optical recording medium while maintaining a satisfactory recording quality, a method of setting a recording parameter forming a recording waveform of the laser (hereinafter referred to as write strategy) and recording the information on the basis of the write strategy is used. It is known that the recording quality has a close relation with a dye, a material, the thickness of the dye, a shape of a groove, recording speed, and the like of the optical recording medium. The write strategy has to be optimally adjusted taking into account these factors.

As examples of the related art, JP-A-2004-185796 and JP-A-2004-335079 can be cited.

SUMMARY OF THE INVENTION

However, optical recording media of types more than drive manufactures can grasp are circulated in the market. Thus, enormous cost and labor are necessary to prepare appropriate write strategies for all the optical recording media circulated in the market. In order to cope with media circulated after drives are shipped, it is necessary to carry out updating and the like of firmware of the drives. Consequently, a technique for automatically adjusting a write strategy adapted to an optical recording medium used by a drive at the time or recording is considered necessary.

Therefore, it is desirable to provide a new and improved optical recording and reproducing apparatus that is capable of optimally adjusting a write strategy in a short time.

According to an embodiment of the invention, there is provided an optical recording and reproducing apparatus that records information according to a front edge and a rear edge of a mark formed on one side of a recording medium in which the information is recorded by a laser. The optical recording and reproducing apparatus includes: a recording-pulse-shift setting unit that shifts a front edge and a rear edge of a recording pulse, which is a recording waveform of the laser, according to an immediately-preceding space length between one mark and another mark located immediately in front of the one mark and an immediately-following space length between the one mark and another mark located immediately behind the one mark and sets a write strategy of the recording pulse; an mark-edge-position evaluating unit that detects a front edge and a rear edge of a mark formed on the basis of the write strategy and detects a front mark edge position error, which is a position error of the front edge of the mark, and a rear mark edge position error, which is a position error of the rear edge of the mark; an assuming unit that assumes that the front mark edge position error is represented by a first linear function having a shift amount of the front edge of the recording pulse and a shift amount of the rear edge of the recording pulse as variables and assumes that the rear mark edge position error is represented by a second linear function having the shift amount of the front edge of the recording pulse and the shift amount of the rear edge of the recording pulse as variables; a sensitivity calculating unit that executes test recording for each of combinations of immediately-preceding space lengths and immediately-following space lengths and then calculates sensitivities represented as respective proportional coefficients included in the first linear function and the second linear function according to the front mark edge position error and the rear mark edge position error detected by the mark-edge-position evaluating unit; and a write-strategy calculating unit that calculates a write strategy of the recording pulse on the basis of the sensitivities.

The recording-pulse-shift setting unit shifts the front edge and the rear edge of the recording pulse according to the immediately-receding space length and the immediately-following space length and sets a write strategy of the recording pulse. The mark-edge-position evaluating unit detects a front edge and a rear edge of a mark formed on the basis of the write strategy set and detects a front mark edge position error and a rear mark edge position error of the mark. The assuming unit assumes that the front mark edge position error is represented by the first linear function having the shift amount of the front edge of the recording pulse and the shift amount of the rear edge of the recording pulse as variables. Moreover, the assuming unit assumes that the rear mark edge position error is represented by the second linear function having the shift amount of the front edge of the recording pulse and the shift amount of the rear edge of the recording pulse as variables. The sensitivity calculating unit executes test recording for each of combinations of immediately-preceding space lengths and immediately-following space lengths and then calculates sensitivities represented by the proportional coefficients included in the first linear function and the second linear function according to the front mark edge position error and the rear mark edge position error detected by the mark-edge-position evaluating unit. The write-strategy calculating unit calculates a write strategy of the recording pulse on the basis of the sensitivities calculated.

With such a constitution, it is possible to reduce the number of unknown numbers such as sensitivities to be calculated, save a recording area consumed by the test recording, and adjust a write strategy in a short time.

The sensitivity calculating unit can calculate the sensitivities assuming that the sensitivity represented by the proportional coefficient included in the first linear function depends on only the immediately-preceding space length and the sensitivity represented by the proportional coefficient included in the second linear function depends on only the immediately-following space length. With such a constitution, it is possible to reduce kinds of mark edge position errors that should be detected for sensitivity calculation and adjust a write strategy in a shorter time.

The sensitivity calculating unit can calculate the sensitivities assuming that, in an initial front mark edge position error that is a front mark edge position error in the case in which both the shift amount of the front edge and the shift amount of the rear edge of the recording pulse are zero in the first linear function and an initial rear mark edge position error that is a rear mark edge position error in the case in which both the shift amount of the front edge and the shift amount of the rear edge of the recording pulse are zero in the second linear function, the initial front mark edge position error does not depend on the immediately-following space length and the initial rear mark edge position error does not depend on the immediately-preceding space length and assuming that the sensitivity represented by the proportional coefficient included in the first linear function does not depend on the immediately-following space length and the sensitivity represented by the proportional coefficient included in the second linear function does not depend on the immediately-preceding space length. The initial front mark edge position error and the initial rear mark edge position error may be values detected when the front edge and the rear edge of the recording pulse are recorded without being shifted or may be calculated by the sensitivity calculating unit. With such a constitution, it is possible to reduce kinds of mark edge position errors that should be detected for calculating sensitivities and an initial mark edge position error and further simplify the mark-edge-position evaluating unit.

The optical recording and reproducing apparatus may include a write-strategy calculating unit that calculates the shift amount of the front edge of the recording pulse and the shift amount of the rear edge of the recording pulse at the time of writing of information on the basis of the sensitivities calculated by the sensitivity calculating unit such that both the front mark edge position error and the rear mark edge position error are zero.

The write-strategy calculating unit calculates the shift amount of the front edge of the recording pulse and the shift amount of the rear edge of the recording pulse at the time of writing of information on the basis of the sensitivities calculated by the sensitivity calculating unit such that both the front mark edge position error and the rear mark edge position error are zero. With such a constitution, it is possible to calculate a suitable write strategy that has less mark edge position errors detected in reading out information.

The recording-pulse-shift setting unit can shift the front edge of the recording pulse according to only the immediately-preceding space length and shift the rear edge of the recording pulse according to only the immediately-following space length. With such a constitution, it is possible to reduce kinds of front and rear space lengths to be distinguished in setting edge shift amounts of the recording pulse and simplify the recording-pulse-shift setting unit.

The sensitivity calculating unit can calculate the respective sensitivities assuming that the sensitivity represented by the proportional coefficient included in the first linear function depends on only the immediately-preceding space length and the sensitivity represented by the proportional coefficient included in the second linear function depends on only the immediately-following space length. With such a constitution, it is possible to reduce kinds of mark edge position errors that should be detected for sensitivity calculation and adjust a write strategy in a shorter time.

The sensitivity calculating unit can calculate the sensitivities assuming that the initial front mark edge position error does not depend on the immediately-following space length and the initial rear mark edge position error does not depend on the immediately-preceding space length and assuming that the sensitivity represented by the proportional coefficient included in the first linear function does not depend on the immediately-following space length and the sensitivity represented by the proportional coefficient included in the second linear function does not depend on the immediately-preceding space length. With such a constitution, it is possible to reduce kinds of mark edge position errors that should be detected to calculate sensitivities and initial mark edge position errors and simplify the recording-pulse-shift setting unit and the mark-edge-position evaluating unit.

The optical recording and reproducing apparatus may include a write-strategy calculating unit that calculates the shift amount of the front edge of the recording pulse and the shift amount of the rear edge of the recording pulse at the time of writing of information such that a square sum of the mark edge position errors (a general term of the front mark edge position error and the rear mark edge position error) calculated according to the immediately-preceding space length and the immediately-following space length is minimized.

The write-strategy calculating unit calculates the shift amount of the front edge of the recording pulse and the shift amount of the rear edge of the recording pulse at the time of writing of information such that the square sum of the mark edge position errors calculated according to the immediately-preceding space length and the immediately-following space length is minimized. More specifically, the square sum of the mark edge position errors is a sum of a square sum concerning the front mark edge position error calculated and a square sum concerning the rear mark edge position error calculated. With such a constitution, it is possible to calculate a suitable write strategy that has less mark edge position errors detected in reading out information.

The optical recording and reproducing apparatus may include a write-strategy calculating unit that calculates, according to a predetermined weighting coefficient for the front mark edge position error and a predetermined weighting coefficient for the rear mark edge position error, the shift amount of the front edge of the recording pulse and the shift amount of the rear edge of the recording pulse at the time of writing of information such that a weighted square sum of the mark edge position errors calculated according to the immediately-preceding space length and the immediately-following space length is minimized.

The write-strategy calculating unit calculates, according to the predetermined weighting coefficient for the front mark edge position error and the predetermined weighting coefficient for the rear mark edge position error, the shift amount of the front edge of the recording pulse and the shift amount of rear edge of the recording pulse at the time of writing of information such that the weighted square sum of the mark edge position errors calculated according to the immediately-preceding space length and the immediately-following space length is minimized. With such a constitution, it is possible to calculate a suitable write strategy that has less mark edge position errors detected in reading out information.

The sensitivity calculating unit can calculate the sensitivities assuming that, with the shift amount of the front edge of the recording pulse set as WSF and the shift amount of the rear edge of the recording pulse set as WSR and using proportional coefficients Cff, Cfr, Crf, and Crr and constants MepeFi and MepeRi, the first linear function MepeF is represented by MepeF=Cff*WSF+Cfr*WSR+MepeFi and the second linear function MepeR is represented by MepeR=Crf*WSF+Crr*WSR+MepeRi. With such a constitution, it is possible to reduce types of mark edge position errors that should be acquired for sensitivity calculation by executing test recording and, at the same time, maintain a suitable recording quality.

The sensitivity calculating unit can select at least three kinds of write strategies and calculates the sensitivities on the basis of mark edge position errors acquired by executing test recording. With such a constitution, it is possible to set a write strategy that realizes a suitable recording quality by executing test recording a small number of times.

The mark-edge-position evaluating unit may calculate a difference metric error that is a difference between a difference metric indicating likelihood of a reproduction sequence obtained as a result of maximum likelihood decoding and an ideal value of the difference metric and calculate the mark edge position errors on the basis of an evaluation value generated by classifying and compiling the calculated difference metric error according to the immediately-preceding space length and the immediately-following space length.

According to another embodiment of the invention, there is provided an optical recording and reproducing method of recording information according to a front edge and a rear edge of a mark formed on a recording medium in which the information is recorded by a laser. The optical recording and reproducing method includes the steps of: setting a write strategy of the recording pulse by shifting a front edge and a rear edge of a recording pulse, which is a recording waveform of the laser, according to an immediately-preceding space length between one mark and another mark located immediately in front of the one mark and an immediately-following space length between the one mark and another mark located immediately behind the one mark; detecting a front edge and a rear edge of a mark formed on the basis of the write strategy and detecting a front mark edge position error, which is a position error of the front edge of the mark, and a rear mark edge position error, which is a position error of the rear edge of the mark; assuming that the front mark edge position error is represented by a first linear function having a shift amount of the front edge of the recording pulse and a shift amount of the rear edge of the recording pulse as variables and assuming that the rear mark edge position error is represented by a second linear function having the shift amount of the front edge of the recording pulse and the shift amount of the rear edge of the recording pulse as variables; executing test recording for each of combinations of immediately-preceding space lengths and immediately-following space lengths and then calculating sensitivities represented as respective proportional coefficients included in the first linear function and the second linear function according to the front mark edge position error and the rear mark edge position error detected in the step of detecting a front mark edge position error and a rear mark edge position error; and calculating a write strategy of the recording pulse on the basis of the sensitivities.

In the step of shifting a front edge and a rear edge of a recording pulse and setting a write strategy, the front edge and the rear edge of the recording pulse are shifted according to the immediately-receding space length and the immediately-following space length and a write strategy of the recording pulse is set. In the step of detecting a front edge and a rear edge of a mark and detecting a front mark edge position error and a rear mark edge position error, a front edge and a rear edge of a mark formed on the basis of the write strategy set are detected and a front mark edge position error and a rear mark edge position error of the mark are detected. In the assuming step, it is assumed that the front mark edge position error is represented by the first linear function having the shift amount of the front edge of the recording pulse and the shift amount of the rear edge of the recording pulse as variables. Moreover, in the assuming step, it is assumed that the rear mark edge position error is represented by the second linear function having the shift amount of the front edge of the recording pulse and the shift amount of the rear edge of the recording pulse as variables. In the step of calculating sensitivities, test recording is executed for each of combinations of immediately-preceding space lengths and immediately-following space lengths and then sensitivities represented by the proportional coefficients included in the first linear function and the second linear function are calculated according to the front mark edge position error and the rear mark edge position error detected in the step of detecting a front edge and a rear edge of a mark and detecting a front mark edge position error and a rear mark edge position error. In the step of calculating a write strategy, a write strategy of the recording pulse is calculated on the basis of the sensitivities calculated.

As explained above, according to the embodiments of the invention, it is possible to suitably adjust a write strategy in a short time.

BRIEF DESCRIPTION OF THE DRAWINGS

FIG. 6 is a schematic diagram of mark edge positions affected by edge shifts of a recording pulse;

FIG. 7A is an example of a matrix equation used in executing full response type correction;

FIG. 7B is an example of a matrix equation used in executing local response type correction;

DESCRIPTION OF THE PREFERRED EMBODIMENTS

Figure 1:
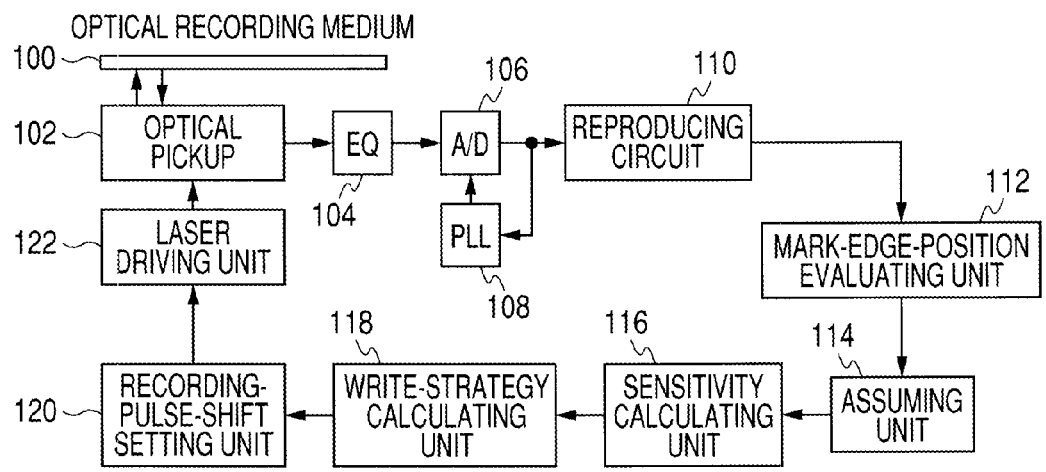
FIG. 1 is a block diagram of an optical recording and reproducing apparatus according to an embodiment of the invention.

Preferred embodiments of the invention will be hereinafter explained in detail with referenced to the accompanying drawings. In this specification and the drawings, components having substantially identical functional structures are denoted by identical reference numerals and signs to omit redundant explanations.

First Embodiment

First, a structure of an optical recording and reproducing apparatus according to a first embodiment of the invention will be explained with reference to FIG. 1. FIG. 1 is a block diagram showing the structure of the optical recording and reproducing apparatus according to this embodiment.

An optical pickup 102 condenses a laser beam emitted from a semiconductor laser with an object lens (not shown) and irradiates the laser beam on an optical recording medium 100. The optical pickup 102 transmits reflected light reflected on the optical recording medium 100 to a photodetector (not shown) via a predetermined optical system and detects a signal according to a reflected light amount.

A reproduction signal read out by the optical pickup 102 is processed by an equalizer (EQ) 104 and then sampled by an A/D converter 106 to be changed to reproduction data as a digital value. A PLL (Phase Locked Loop) circuit 108 generates a reproduction clock that synchronizes with the reproduction data. The reproduction clock is used as a sampling clock of the A/D converter 106 and supplied to a reproduction circuit 110 as a processing clock.

Information on a front edge and a rear edge of a detected mark is transmitted to a mark-edge-position evaluating unit 112 from the reproduction circuit 110. A front mark edge position error and a rear mark edge position error corresponding to various combinations of immediately-preceding space lengths and immediately-following space lengths are detected.

Mark edge position errors according to this embodiment will be described. When a space length between marks adjacent to each other is small, positions of mark edges shift because of an influence by thermal interference and the like (see, for example, the schematic diagram in FIG. 2). Conversely, since edge positions of a mark having large space lengths in front of and behind the mark is little affected by the influence of the thermal interference and the like, it is considered that substantially ideal edge positions are obtained. Thus, in this embodiment, as an example, with edge positions in the case in which space lengths in front of and behind a mark are sufficiently large (e.g., 5T or more: T is a channel clock cycle) as references, differences between detected edge positions and the references are set as mark edge position errors. It goes without saying that a method of detecting reference edge positions is not limited to this. A method of acquiring mark edge position errors will be described later.

The sensitivity calculating unit 116 calculates sensitivities indicating amounts of changes of the mark edge position errors with respect to edge shift amounts of the recording pulse on the basis of the information on the mark edge position errors detected by the mark-edge-position evaluating unit 112. In this case, the assuming unit 114 assumes that the mark edge position errors and the edge shift amounts of the recording pulse are in a linear relation. The sensitivities are calculated according to predetermined linear functions taking into account the linearity. Moreover, the write-strategy calculating unit 118 calculates edge shift amounts of the recording pulse for minimizing the mark edge position errors and calculates a write strategy on the basis of the sensitivities calculated by the sensitivity calculating unit 116.

The recording-pulse-shift setting unit 120 shifts the edges of the recording pulse and sets a write strategy on the basis of the shift amount of the front edge of the recording pulse and the shift amounts of the rear edge of the recording pulse calculated by the write-strategy calculating unit 118.

The laser driving unit 122 controls to drive a semiconductor laser on the basis of the write strategy set by the recording-pulse-shift setting unit 120 and records information in the optical recording medium 100 via the optical pickup 102.

Figure 3:
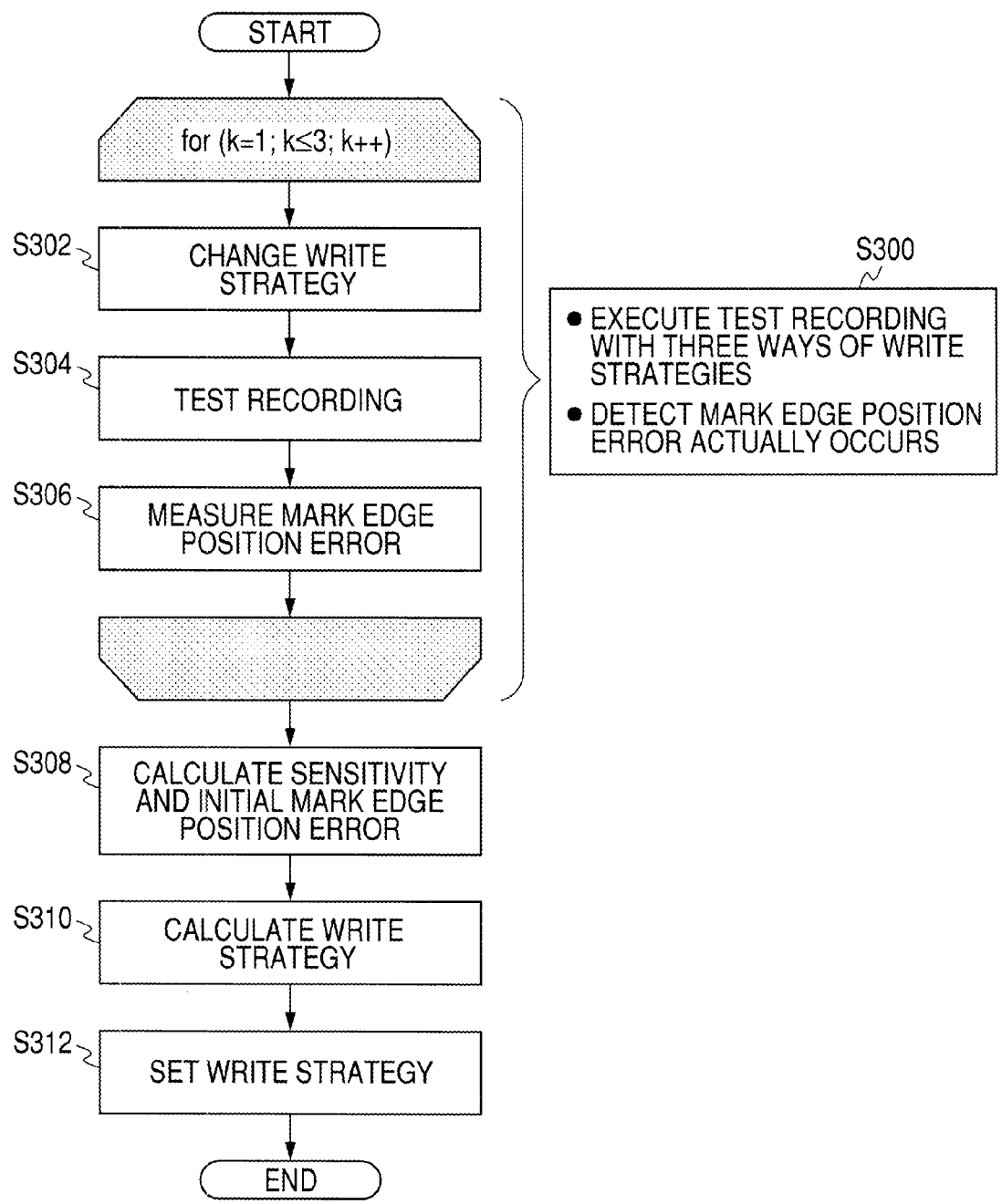
FIG. 3 is a flowchart showing a process of calculating an optimum write strategy.

A procedure for setting an optimum write strategy in the optical recording and reproducing apparatus according to the first embodiment will be explained with reference to FIG. 3. FIG. 3 is a flowchart showing a method of setting a write strategy according to this embodiment. In this explanation, three kinds of test recording are executing in calculating an optimum write strategy. It goes without saying that kinds of test recording are not limited to three kinds and it is also possible to execute four or more kinds of test recording and calculate a write strategy on the basis of a result obtained by the test recording.

At a pre-stage of adjustment of a write strategy, an initial strategy is set in advance as a reference. The initial strategy is a set value recorded in a recording medium in advance, which is decided by a media manufacturer, or a set value stored in a drive in advance as an initial value by a drive manufacturer, or the like. Therefore, in the following explanation, an edge shift amount of a recording pulse means a shift amount from the initial strategy.

Step S300 indicates a step of executing three kinds of test recording and actually detecting mark edge position errors. In this case, steps S302 to S306 are repeatedly executed three times. When four or more kinds of test recording are executed, these steps are repeatedly executed a necessary number of times.

Figure 2:
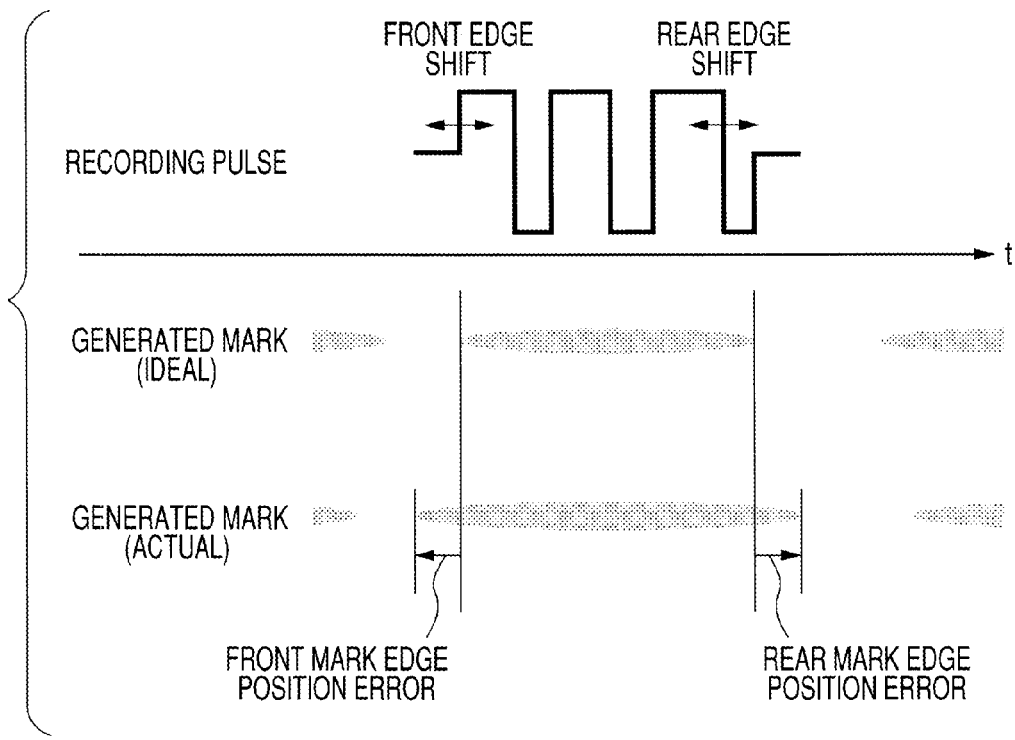
FIG. 2 is a schematic diagram showing edge shifts of a recording pulse and mark edge position errors.

In step S302, the optical recording and reproducing apparatus shifts a front edge and a rear edge of a recording pulse (see, for example, the schematic diagram in FIG. 2) by predetermined shift amounts and changes a write strategy. The front edge and the rear edge of the recording pulse shown in FIG. 2 is only an example. A combination of an edge and a position can be appropriately selected according to a recording waveform, a medium in use, and the like. In step S304, the optical recording and reproducing apparatus executes test recording on the basis of the write strategy changed in step S302. In step S306, the optical recording and reproducing apparatus detects mark edge position errors using the mark-edge-position evaluating unit 112.

Figure 4:
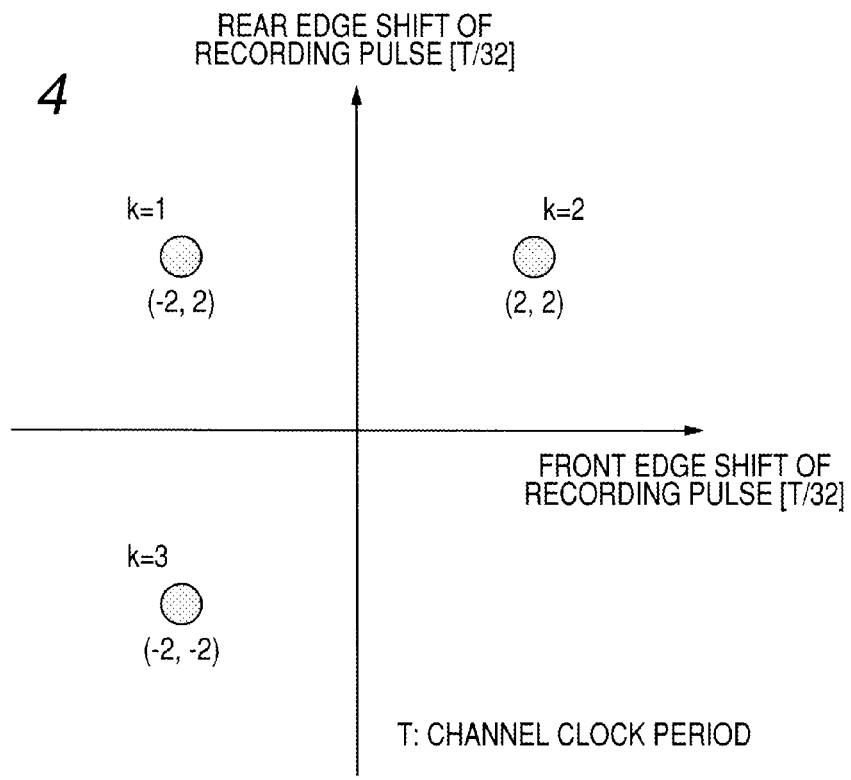
FIG. 4 is an example of setting of an edge shift amount of a recording pulse used for test recording.

In the following explanation, steps S302 to S306 described above will be described in detail using a more specific example. In step S302, the optical recording and reproducing apparatus sets a shift amount WSF of the front edge of the recording pulse and a shift amount WSR of the rear edge of the recording pulse in the three kinds of test recording as follows (see FIG. 4).

$$\begin{bmatrix} WSF_k(i,j) \\ WSR_k(i,j) \end{bmatrix} = \begin{bmatrix} WSF_k \\ WSR_k \end{bmatrix} (k=1,2,3) \qquad (1)$$

The optical recording and reproducing apparatus sets the respective shift amounts as follows.

$$\begin{bmatrix} WSF_1 \\ WSR_1 \end{bmatrix} = \begin{bmatrix} -2[T/32] \\ 2[T/32] \end{bmatrix}, \qquad (2)$$

$$\begin{bmatrix} WSF_2 \\ WSR_2 \end{bmatrix} = \begin{bmatrix} 2[T/32] \\ 2[T/32] \end{bmatrix},$$

$$\begin{bmatrix} WSF_3 \\ WSR_3 \end{bmatrix} = \begin{bmatrix} -2[T/32] \\ -2[T/32] \end{bmatrix}$$

Note that i and j indicate an immediately-preceding space length and an immediately-following space length, respectively. In this example, the edge shift amounts of the recording pulse are set as an identical value regardless of the immediately-preceding space length and the immediately-following space length. T indicates a channel clock cycle. For example, in the case of a Blu-ray Disc, 2[T/32] is equivalent to about 1 [ns].

In step S304, the optical recording and reproducing apparatus executes test recording in accordance with three kinds of write strategies formed on the basis of a shift amount $WSF_k$ of the front edge of the recording pulse and a shift amount $WSR_k$ of the rear edge of the recording pulse set in step S302. In step S306, the optical recording and reproducing apparatus detects the following values of mark edge position errors MepeF and MepeR of respective marks formed by the test recording in step S304.

$$\begin{bmatrix} MepeF_k(i,j) \\ MepeR_k(i,j) \end{bmatrix} (k=1,2,3) \quad (3)$$

In step S308, the optical recording and reproducing apparatus calculates sensitivities of changes in the mark edge position errors with respect to the edge shifts of the recording pulse on the basis of the mark edge position errors obtained by executing steps S302 to S306. A method of calculating sensitivities will be described in detail.

In the optical recording and reproducing apparatus according to this embodiment, it is assumed that the mark edge position errors can be represented by linear functions (MepeF is hereinafter referred to as first linear function and MepeR is hereinafter referred to as second linear function) having the shift amount WSF of the front edge of the recording pulse and the shift amount WSR of the rear edge of the recording pulse as variables. Specifically, the front mark edge position error MepeF, which is a position error of the front edge of the mark, and the rear mark edge position error MepeR, which is a position error of the rear edge of the mark, can be represented by a matrix equation indicated by the following equation.

$$\begin{bmatrix} MepeF(i,j) \\ MepeR(i,j) \end{bmatrix} = \begin{bmatrix} Cff(i,j) & Cfr(i,j) \\ Crf(i,j) & Crr(i,j) \end{bmatrix} \begin{bmatrix} WSF(i,j) \\ WSR(i,j) \end{bmatrix} + \begin{bmatrix} MepeFi(i,j) \\ MepeRi(i,j) \end{bmatrix} \quad (4)$$

Note that i and j indicate an immediately-preceding space length and an immediately-following space length, respectively. Coefficients Cff, Cfr, Crf, and Crr in Equation (4) represent sensitivities of changes of the mark edge position errors with respect to the edge shifts of the recording pulse. MepeFi and MepeRi indicate a front mark edge position error and a rear mark edge position error that are observed when both the shift amount WSF of the front edge of the recording pulse and the shift amount WSR of the rear edge of the recording pulse are zero, respectively.

As described already, the shift amount WSF of the front edge of the recording pulse in the test recording and the shift amount WSR of the rear edge of the recording pulse in the test recording are parameters set as indicated by Equation (2). On the other hand, test recording is executed on the basis of these set parameters and the front mark edge position error MepeF and the rear mark edge position error MepeR of the recorded mark are detected.

As a characteristic of Equation (4), since a matrix equation holds for each of combinations of immediately-preceding space lengths and immediately-following space lengths, only three kinds of shift amounts of the recording pulse in the test recording is necessary for each of the combinations. Moreover, the edge shifts of the recording pulse do not have to be sequentially performed for each of the combinations and can be performed simultaneously. In other words, it is possible to execute full adjustment with three kinds of recording strategies in the test recording by simultaneously shifting recording pulses having different immediately-preceding space lengths and immediately-following space lengths. Conversely, when values of mark edge position errors corresponding to a combination (i,j) of predetermined front and rear space lengths also depend on edge shifts amounts of a recording pulse corresponding to a combination (k,l) of front and rear space lengths different from the combination (i,j) of the front and rear space lengths, there are an enormous kinds of shift amounts of the recording pulse in the test recording. As a result, a recording area and a recording time necessary for the test recording are wasted.

As a most important characteristic of the first embodiment, even when there are an enormous kinds of mark edge positions that should be adjusted at a time because of the number of combinations of immediately-preceding space lengths and immediately-following space lengths, kinds of necessary test recording strategies are not changed and, if test recording is executed with at least three kinds of test strategies, it is possible to determine a suitable write strategy. This characteristic will be described later citing a specific example.

If respective detection values obtained by the three kinds of test recording are used, the respective sensitivities and the initial mark edge position errors are calculated as follows using a relation in Equation (4).

$$\begin{bmatrix} Cff(i,j) & Cfr(i,j) \\ Crf(i,j) & Crr(i,j) \end{bmatrix} = \begin{bmatrix} \Delta MepeF_{12}(i,j) & \Delta MepeF_{13}(i,j) \\ \Delta MepeR_{12}(i,j) & \Delta MepeR_{13}(i,j) \end{bmatrix} \begin{bmatrix} \Delta WSF_{12} & \Delta WSF_{13} \\ \Delta WSR_{12} & \Delta WSR_{13} \end{bmatrix}^{-1}, \quad (5)$$

$$\begin{bmatrix} MepeFi(i,j) \\ MepeRi(i,j) \end{bmatrix} = \begin{bmatrix} MepeF_1(i,j) \\ MepeR_1(i,j) \end{bmatrix} - \begin{bmatrix} Cff(i,j) & Cfr(i,j) \\ Crf(i,j) & Crr(i,j) \end{bmatrix} \begin{bmatrix} WSF_1 \\ WSR_1 \end{bmatrix} \quad (6)$$

Note that ΔMepeF, ΔMepeR, ΔWSF, and ΔWSR are defined as follows.

$$\begin{bmatrix} \Delta WSF_{lm} \\ \Delta WSR_{lm} \end{bmatrix} = \begin{bmatrix} WSF_m \\ WSR_m \end{bmatrix} - \begin{bmatrix} WSF_l \\ WSR_l \end{bmatrix}, \quad (7)$$

$$\begin{bmatrix} \Delta MepeF_{lm}(i,j) \\ \Delta MepeR_{lm}(i,j) \end{bmatrix} = \begin{bmatrix} MepeF_m(i,j) \\ MepeR_m(i,j) \end{bmatrix} - \begin{bmatrix} MepeF_l(i,j) \\ MepeR_l(i,j) \end{bmatrix}$$

$(l = 1, 2, 3, m = 1, 2, 3)$

A subscript −1 represents an inverse matrix.

Figure 5:
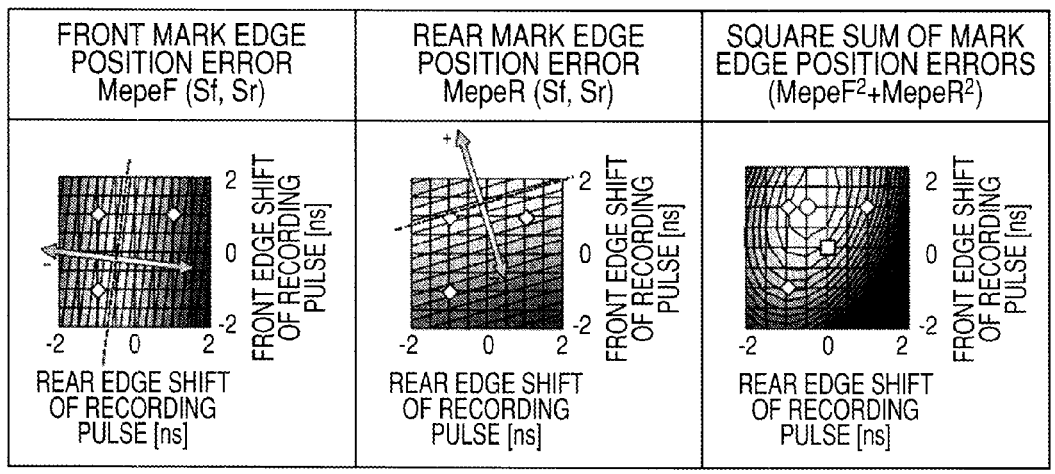
FIG. 5 is an example of a contour map showing a relation between an edge shift amount of a recording pulse and a mark edge position error calculated on the basis of sensitivities calculated.

When the sensitivities calculated by Equation (5) and the initial mark edge position errors calculated by Equation (6) are used, it is possible to calculate mark edge position errors with respect to edge shift amounts of an arbitrary recording pulse. For example, as shown in FIG. 5, it is possible to draw a contour map with a shift amount of a front edge of a recording pulse and a shift amount of a rear edge of the recording pulse set as an x axis and a y axis, respectively. A shade shown in a left drawing in FIG. 5 is darker as a front mark edge position error is larger. Similarly, a shade shown in a center drawing in FIG. 5 is darker as a rear mark edge position error is larger. A shade in a right drawing in FIG. 5 is darker as a square sum of the mark edge position errors is larger. Referring to the right drawing in FIG. 5, for example, optimum edge shift amounts of the recording pulse for minimizing the square sum of the mark edge position errors are indicated in a lightest portion.

Thus, a step (S310) of calculating an optimum write strategy using the sensitivities and the initial mark edge position errors calculated in step S308 will be described in detail.

The optimum write strategy is a write strategy with edge shift amounts of a recording pulse adjusted to reduce mark edge position errors to zero. The edge shift amounts WSF and WSR of the recording pulse for reducing the front mark edge position error MepeF and the rear mark edge position error MepeR on the left side of Equation (4) to zero are calculated as follows.

$$\begin{bmatrix} WSF(i,j) \\ WSR(i,j) \end{bmatrix} = -\begin{bmatrix} Cff(i,j) & Cfr(i,j) \\ Crf(i,j) & Crr(i,j) \end{bmatrix}^{-1}\begin{bmatrix} MepeFi(i,j) \\ MepeRi(i,j) \end{bmatrix} \quad (8)$$

Therefore, using the sensitivities Cff, Cfr, Crf, and Crr calculated by Equation (5), the initial mark edge position errors MepeFi and MepeRi calculated by Equation (6), an optimum write strategy corresponding to various combinations of immediately-preceding space lengths and immediately-following space lengths is calculated according to the edge shift amounts of the recording pulse calculated by Equation (8).

Finally, in step S312, the write strategy is changed to the optimum write strategy calculated in step S310.

As described above, in the first embodiment, the optimum write strategy is calculated and set through steps S302 to S312.

According to the first embodiment, even when sensitivities are calculated while immediately-preceding space lengths and immediately-following space lengths are distinguished, only three kinds of shift amounts of a recording pulse in test recording are necessary. Moreover, it is possible to execute full adjustment with three kinds of write strategies in the test recording regardless of the number of combinations by simultaneously shifting recording pulses having different combinations of immediately-preceding space lengths and immediately-following space lengths. This makes it possible to save time necessary for write strategy adjustment and a recording area of a recording medium used for the test recording. This characteristic is obtained because it is assumed that an independent matrix equation (Equation (4)) holds according to each of combinations of front and rear space lengths. In the following explanation, this method is referred to as local response type correction.

A more general case in which changes in edge shift amounts of a recording pulse corresponding to one combination of front and rear space lengths affect mark edge position errors corresponding to another combination of front and rear space lengths (hereinafter referred to as full response type correction) and the local response type correction will be compared.

First, a difference between the local response type correction and the full response type correction will be explained with reference to FIG. 6. In the figure, a combination of an immediately-preceding space length X, a mark length Y, and an immediately-following space length Z may be simply represented as XsYmZs. A unit of the respective lengths is the channel clock cycle T. FIG. 6 is a diagram schematically showing mark edge positions affected by shift of a front edge of a partial recording pulse (in the figure, 3s2m4s) included in a recording waveform. Respective arrows in the figure indicate influences on the mark edge positions caused by an edge shift of the recording pulse.

As described already, when edges of the recording pulse are shifted, mark edge positions adjacent to each other are affected by an effect of thermal interference. Moreover, it is considered that an overall balance of a mark string formed changes because of mark edge position errors of marks adjacent to each other caused by this influence and this affects other mark edge positions not adjacent to the mark edge positions. A method of correcting the mark edge position errors taking into account such an influence on all the marks is the full response type correction.

On the other hand, it is considered that an influence of the edge shift on mark edges in positions physically remote from the marks generated by the recording pulse in which the edge is shifted is negligibly small compared with the influence on the edge positions of the marks generated. In the local response type correction, taking into account this physical positional relation, it is approximated that edge shift of a recording pulse affects only front edge positions and rear edge positions of marks generated by the recording pulse.

These two kinds of correction methods are written in matrix equations as shown in, for example, FIGS. 7A and 7B. FIG. 7A shows the full response type correction and FIG. 7B shows the local response type correction. In FIGS. 7A and 7B, when a mark length is 3T, combinations of front and rear space lengths of the mark are 2T, 3T, or ≧4T. In FIGS. 7A and 7B, "≧4s" is represented as "4s".

Referring to FIG. 7A, eighteen kinds of sensitivities and one kind of initial mark edge position error are necessary for calculating one kind of mark edge position error. Therefore, in order to calculate all unknown numbers (sensitivities and initial mark edge position errors), it is necessary to set nineteen kinds of write strategies to execute test recording and detect mark edge position errors. In this case, the number of elements of a matrix representing sensitivities is 18*18=324 and, with the addition of the number of initial mark edge position errors 18, the unknown numbers is 342.

On the other hand, referring to FIG. 7B, initial values of two kinds of sensitivities and one kind of mark edge position error are enough for calculating one kind of mark edge position error. Therefore, in order to calculate all unknown numbers (sensitivities and initial mark edge position errors), it is sufficient to set three kinds of write strategies to execute test recording and detect mark edge position errors. In this case, the number of elements of a matrix representing sensitivities is 18*2=36 and, with the addition of an initial value of mark edge position errors 18, unknown numbers are only 54.

Figure 7C:
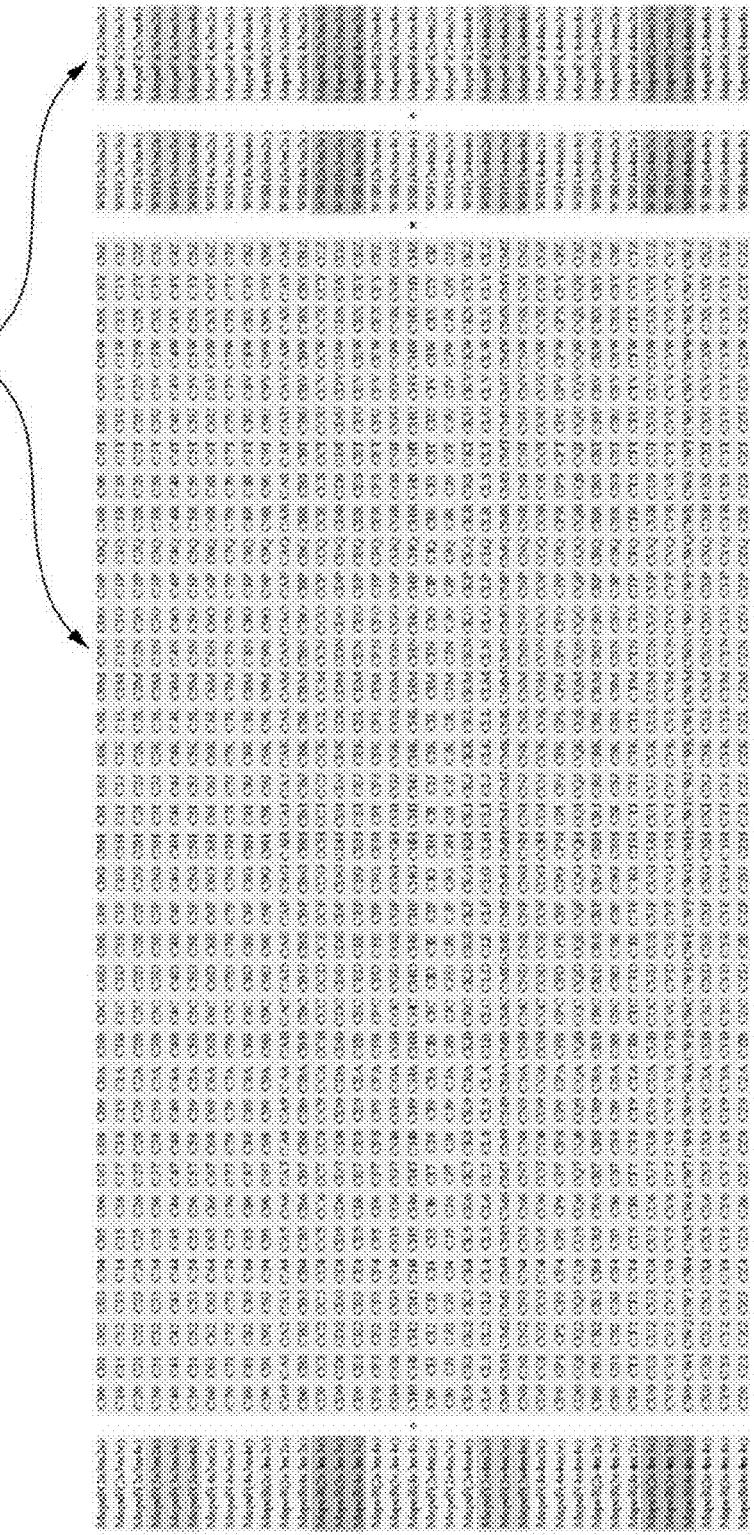
FIG. 7C is an example of a matrix equation used in executing full response type correction.

A matrix equation according to the full response type correction in the case in which mark lengths are distinguished from one another is shown in FIG. 7C. In this case, unknown numbers are 36*36+36=1332.

When a write strategy is actually adjusted, as described above, mark lengths are also distinguished from one another. Moreover, front and rear space lengths need to be distinguished from each other more often. In such a case, there is a substantial difference in unknown numbers, which need to be calculated, between the full response type correction and the local response type correction. As a result, in the local response type correction, it is possible to substantially reduce a correction time compared with the full response type correction. Therefore, when it is necessary to perform high-speed write strategy adjustment, the local response type correction described in the first embodiment is suitable.

A method of increasing speed of a step of calculating sensitivities in addition to the approximation method of the local response type correction described in the first embodiment will be described below.

Second Embodiment

A method of calculating a write strategy according to a second embodiment of the invention will be described. Explanations concerning elements substantially identical with those in the first embodiment are omitted and only differences are described in detail.

In the first embodiment, all of the mark edge position errors, the edge shift amounts of the recording pulse, and the sensitivities are calculated as depending on an immediately-preceding space length and an immediately-following space length. However, depending on a type of an optical recording medium to be used, a recording environment, or the like, mark edge position errors are sufficiently within an allowable range even if an optimum write strategy is calculated concerning a part of parameters without distinguishing immediately-preceding space lengths or immediately-following space lengths.

Thus, in an explanation of the second embodiment, it is possible to approximate that the sensitivities Cff and Cfr of the front mark edge position error MepeF with respect to the shift amount WSF of the front edge of the recording pulse and the shift amount WSR of the rear edge of the recording pulse depend on only an immediately-preceding space length and the sensitivities Crf and Crr of the rear mark edge position error MepeR with respect to the shift amount WSF of the front edge of the recording pulse and the shift amount WSR of the rear edge of the recording pulse depend on only an immediately-following space length.

In the step of calculating a write strategy in the first embodiment, the sensitivity calculating unit 116 further calculates the respective sensitivities assuming that the proportional coefficients Cff and Cfr included in the first linear function depend on only an immediately-preceding space length and the proportional coefficients Crf and Crr included in the second linear function MepeR depend on only an immediately-following space length.

Taking into account the approximation described above, it is possible to rewrite Equation (4) as follows.

$$\begin{bmatrix} MepeF(i,j) \\ MepeR(i,j) \end{bmatrix} = \begin{bmatrix} Cff(i) & Cfr(i) \\ Crf(j) & Crr(j) \end{bmatrix}\begin{bmatrix} WSF(i,j) \\ WSR(i,j) \end{bmatrix} + \begin{bmatrix} MepeFi(i,j) \\ MepeRi(i,j) \end{bmatrix} \quad (9)$$

Note that i indicates an immediately-preceding space length and j indicates an immediately following space length.

In step S302, the shift amounts WSF of front edges of three kinds of recording pulses and the shift amounts WSR of rear edges of the recording pulses are defined as follows.

$$\begin{bmatrix} WSF_k(i,j) \\ WSR_k(i,j) \end{bmatrix} = \begin{bmatrix} WSF_k \\ WSR_k \end{bmatrix} \quad (k=1,2,3) \quad (10)$$

Figure 8:
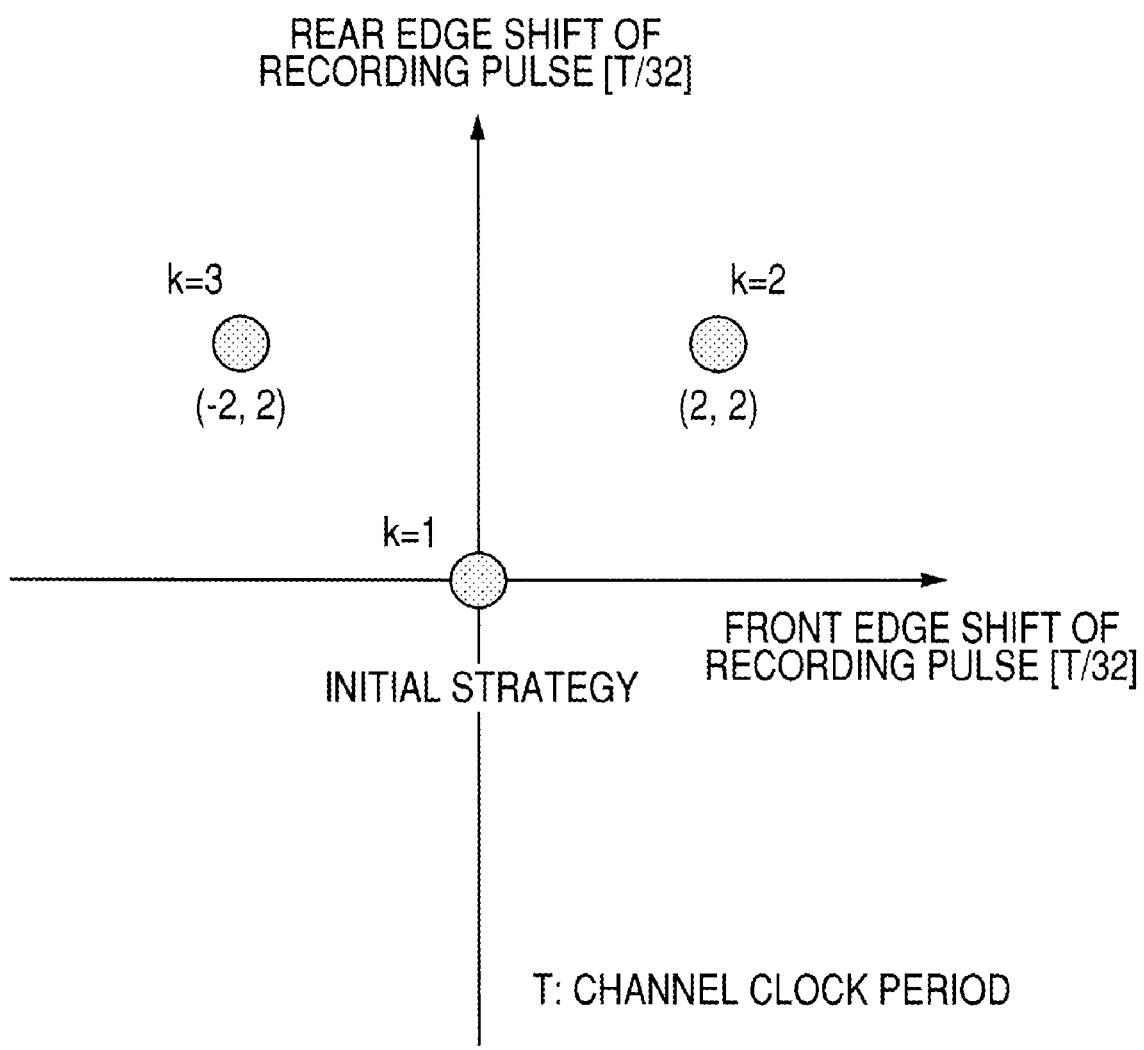
FIG. 8 is an example of setting of an edge shift amount of a recording pulse used for test recording.

The respective shift amounts are set as follows (See FIG. 8).

$$\begin{bmatrix} WSF_1 \\ WSR_1 \end{bmatrix} = \begin{bmatrix} 0[T/32] \\ 0[T/32] \end{bmatrix}, \quad (11)$$

$$\begin{bmatrix} WSF_2 \\ WSR_2 \end{bmatrix} = \begin{bmatrix} 2[T/32] \\ 2[T/32] \end{bmatrix},$$

-continued $$\begin{bmatrix} WSF_3 \\ WSR_3 \end{bmatrix} = \begin{bmatrix} -2[T/32] \\ 2[T/32] \end{bmatrix}$$

Note that i and j indicate an immediately-preceding space length and an immediately-following space length. In this example, edge shift amounts of the recording pulses are set as an identical value regardless of the immediately-preceding space length and the immediately-following space length.

In step S304, the optical recording and reproducing apparatus executes test recording with three kinds of write strategies formed on the basis of the shift amounts $WSF_k$ of the front edges of the recording pulses and the shift amounts $WSR_k$ of the rear edges of the recording pulses set in step S302. Moreover, in step S306, the optical recording and reproducing apparatus detects the following values of the mark edge position errors MepeF and MepeR of respective marks formed by the test recording in step S304.

$$\begin{bmatrix} MepeF_k(i) \\ MepeR_k(j) \end{bmatrix} (k=1,2,3), \quad (12)$$

$$\begin{bmatrix} MepeF_k(i,j) \\ MepeR_k(i,j) \end{bmatrix} (k=1) \quad (13)$$

When respective detection values obtained by three kinds of test recording are used, the respective sensitivities and the initial mark edge position errors are calculated as follows using the relation of Equation (9).

First, the sensitivities are calculated as follows.

$$\begin{bmatrix} Cff(i) & Cfr(i) \\ Crf(j) & Crr(j) \end{bmatrix} = \quad (14)$$

$$\begin{bmatrix} \Delta MepeF_{12}(i,j) & \Delta MepeF_{13}(i,j) \\ \Delta MepeR_{12}(i,j) & \Delta MepeR_{13}(i,j) \end{bmatrix}\begin{bmatrix} \Delta WSF_{12} & \Delta WSF_{13} \\ \Delta WSR_{12} & \Delta WSR_{13} \end{bmatrix}^{-1}$$

It is assumed that the proportional coefficients Cff and Cfr depend on only an immediately-preceding space length and the proportional coefficients Crf and Crr depend on only an immediately-following space length. Edge shift amounts of the recording pulses are set as an identical value regardless of the immediately-preceding space length and the immediately-following space length. Therefore, the equation is rewritten as follows.

$$\begin{bmatrix} Cff(i) & Cfr(i) \\ Crf(j) & Crr(j) \end{bmatrix} = \begin{bmatrix} \Delta MepeF_{12}(i) & \Delta MepeF_{13}(i) \\ \Delta MepeR_{12}(j) & \Delta MepeR_{13}(j) \end{bmatrix} \quad (15)$$

$$\begin{bmatrix} \Delta WSR_{12} & \Delta WSF_{13} \\ \Delta WSR_{12} & \Delta WSR_{13} \end{bmatrix}$$

The initial mark edge position errors are considered. The initial mark edge position errors are represented as follows because measurement is directly executed in k=1 kind of test recording (see Equation (11)).

$$\begin{bmatrix} MepeFi(i,j) \\ MepeRi(i,j) \end{bmatrix} = \begin{bmatrix} MepeF_1(i,j) \\ MepeR_1(i,j) \end{bmatrix} \quad (16)$$

ΔMepeF, ΔMepeR, ΔWSF, and ΔWSR are defined as follows.

$$\begin{bmatrix} \Delta WSF_{lm} \\ \Delta WSR_{lm} \end{bmatrix} = \begin{bmatrix} WSF_m \\ WSR_m \end{bmatrix} - \begin{bmatrix} WSF_l \\ WSR_l \end{bmatrix}, \quad (17)$$

$$\begin{bmatrix} \Delta MepeF_{lm}(i) \\ \Delta MepeR_{lm}(j) \end{bmatrix} = \begin{bmatrix} MepeF_m(i) \\ MepeR_m(j) \end{bmatrix} - \begin{bmatrix} MepeF_l(i) \\ MepeR_l(j) \end{bmatrix}$$

$$(l = 1, 2, 3, m = 1, 2, 3)$$

A subscript −1 represents an inverse matrix.

From Equation (9), edge shift amounts of the recording pulses for reducing the front mark edge position error MepeF and the rear mark edge position error MepeR to zero are calculated as follows and a write strategy is calculated.

$$\begin{bmatrix} WSF(i, j) \\ WSR(i, j) \end{bmatrix} = - \begin{bmatrix} Cff(i) & Cfr(i) \\ Crf(j) & Crr(j) \end{bmatrix}^{-1} \begin{bmatrix} MepeFi(i, j) \\ MepeRi(i, j) \end{bmatrix} \quad (18)$$

When the sensitivities are approximated as indicated by Equation (9), it is possible to reduce the number of classifications of sensitivities compared with the case of Equation (4). In other words, it is possible to reduce kinds of mark edge position errors acquired for sensitivity calculation and, as a result, it is possible to reduce time for adjusting a write strategy.

Specifically, concerning a total number Ne of mark edge position errors that should be acquired by test recording, Equation (4) (the first embodiment) and Equation (9) (the second embodiment) are compared.

For convenience of explanation, kinds of immediately-preceding space lengths and immediately-following space lengths distinguished in mark edge position errors, edge shift amounts of a recording pulse, and sensitivities are limited to three, namely, 2T, 3T, and 4T or more (see Tables 1(a) and 1(b)). A representation ≧4T may be used to indicate 4T or more. T indicates a channel clock cycle and 2T is a minimum space length used for recording. When the kinds of front and rear space lengths are defined in this way, kinds of mark edge position errors that should be adjusted are as shown in tables below.

When the number of classifications of the immediately-preceding space length and the number of classifications of the immediately-following space length considered in adjustment of a write strategy are set as Nsf and Nsr, respectively, kinds Np of the mark edge position errors that should be adjusted are represented as follows.

$$Np = Nsf \times Nsr \times 2 \quad (19)$$

Therefore, in the case of specific examples shown in Tables 1(a) and 1(b), since Nsf=Nsr=3, Np=18. Kinds of the mark edge position errors that should be adjusted are 18 elements.

When kinds of mark edge position errors that should be acquired in kth test recording is set as ne(k), a value of ne(k) in the first embodiment is set as ne1(k), and a value of ne(k) in the second embodiment is set as ne2(k), ne1(k) and ne2(k) are calculated as follows.

Number of mark edge position errors that should be acquired in each kind of test recording in the first embodiment $$ne1(k) = Np = 18 \quad (k=1, 2, 3) \quad (20)$$

Number of mark edge position errors that should be acquired in each kind of test recording in the second embodiment $$ne2(k) = \quad (21)$$

$$\begin{cases} \left\{ \begin{array}{l} (Nsf \times 1) + \\ (1 \times Nsr) \end{array} \right\} + Np = \{3+3\} + 18 = 24 \ (k=1) \\ \left\{ \begin{array}{l} (Nsf \times 1) + \\ (1 \times Nsr) \end{array} \right\} \quad = \{3+3\} = 6 \qquad (k=2, 3) \end{cases}$$

When a total number of mark edge position errors that should be acquired by executing three kinds of test recording is set as Ne, Ne is calculated as follows.

$$Ne = \Sigma ne(k) \quad (22)$$

Therefore, when Equation (4) is used (the first embodiment), a total number Ne1 of mark edge position errors that should be acquired by executing test recording is calculated as follows.

$$Ne1 = \Sigma ne1(k) = 18+18+18 = 54 \quad (23)$$

This means that it is necessary to acquire fifty-four kinds of mark edge position errors.

TABLE 1(a)

Front mark edge position errors to be adjusted

| | | Immediately-following space length | | |
|---|---|---|---|---|
| | | 2T Space | 3T Space | ≧4T Space |
| Immediately-preceding space length | 2T Space | MepeF(2, 2) | MepeF(2, 3) | MepeF(2, ≧4) |
| | 3T Space | MepeF(3, 2) | MepeF(3, 3) | MepeF(3, ≧4) |
| | ≧4T Space | MepeF(≧4, 2) | MepeF(≧4, 3) | MepeF(≧4, ≧4) |

TABLE 1(b)

Rear mark edge position errors to be adjusted

| | | Immediately-following space length | | |
|---|---|---|---|---|
| | | 2T Space | 3T Space | ≧4T Space |
| Immediately-preceding space length | 2T Space | MepeR(2, 2) | MepeR(2, 3) | MepeR(2, ≧4) |
| | 3T Space | MepeR(3, 2) | MepeR(3, 3) | MepeR(3, ≧4) |
| | ≧4T Space | MepeR(≧4, 2) | MepeR(≧4, 3) | MepeR(≧4, ≧4) |

On the other hand, when Equation (9) is used (the second embodiment), a total number Ne2 of mark edge position errors that should be acquired by executing test recording is calculated as follows.

$$Ne2 = \Sigma ne2(k) = 24+6+6 = 36 \quad (24)$$

This means that thirty-six kinds of mark edge position errors only have to be acquired. As a result, compared with the first embodiment, a total number of mark edge position errors for which measurement is necessary is reduced by Ne2/Ne1=36/54 times.

Third Embodiment

A method of calculating a write strategy according to a third embodiment of the invention will be explained. Explanations substantially identical with the explanations in the first embodiment are omitted and only differences are described in detail.

As described above, depending on a type of an optical recording medium to be used, a recording environment, and the like, even if an optimum write strategy is calculated without distinguishing immediately-preceding space lengths or immediately-following space lengths concerning a part of parameters, mark edge position errors may be within a sufficiently allowable range. Thus, in the third embodiment, in addition to the approximation taken into account in the second embodiment, it is approximated that the initial front mark edge position error MepeFi does not depend on an immediately-following space length and the initial rear edge position error MepeRi does not depend on an immediately-preceding space length.

In the explanation of the third embodiment, in the step of calculating a write strategy in the first embodiment, the sensitivity calculating unit 116 further calculates respective sensitivities assuming that the initial front mark edge position error MepeFi of the initial front mark edge position error MepeFi and the initial rear mark edge position error MepeRi does not depend on an immediately-following space length and the initial rear mark edge position error MepeRi does not depend on an immediately-preceding space length and assuming that sensitivities represented by the proportional coefficients Cff and Cfr included in the first linear function do not depend on the immediately-following space length and sensitivities represented by the proportional coefficients Crf and Crr included in the second linear function do not depend on the immediately-preceding space length.

Therefore, a matrix equation equivalent to Equation (4) in the first embodiment and Equation (9) in the second embodiment is approximated as follows.

$$\begin{bmatrix} MepeF(i,j) \\ MepeR(i,j) \end{bmatrix} = \begin{bmatrix} C\!f\!f(i) & C\!f\!r(i) \\ C\!r\!f(j) & C\!r\!r(j) \end{bmatrix} \begin{bmatrix} WSF(i,j) \\ WSR(i,j) \end{bmatrix} + \begin{bmatrix} MepeFi(i) \\ MepeRi(j) \end{bmatrix} \quad (25)$$

Note that i indicates an immediately-preceding space length and j indicates an immediately-following space length.

In step S302, the optical recording and reproducing apparatus sets the shift amounts WSF of front edges of recording pulses and the shift amounts WSR of rear edges of the recording pulses in three kinds of test recording as in the first embodiment (see Equations (1) and (2)).

In step S304, the optical recording and reproducing apparatus executes test recording in accordance with three kinds of write strategies formed on the basis of the shift amounts $WSF_k$ of the front edges of the recording pulses and the shift amounts $WSR_k$ of the rear edges of the recording pulses set in step S302. Moreover, in step S306, the optical recording and reproducing apparatus detects the following values of the mark edge position errors MepeF and MepeR of respective marks formed by the test recording in step S304.

$$\begin{bmatrix} MepeF_k(i) \\ MepeR_k(j) \end{bmatrix} (k = 1, 2, 3) \quad (26)$$

If respective detection values obtained by the three kinds of test recording are used, the respective sensitivities and the initial mark edge position errors are calculated as follows using the relation of Equation (25).

First, the sensitivities are calculated by the following equation.

$$\begin{bmatrix} C\!f\!f(i) & C\!f\!r(i) \\ C\!r\!f(j) & C\!r\!r(j) \end{bmatrix} = \begin{bmatrix} \Delta MepeF_{12}(i,j) & \Delta MepeF_{13}(i,j) \\ \Delta MepeR_{12}(i,j) & \Delta MepeR_{13}(i,j) \end{bmatrix}$$
$$\begin{bmatrix} \Delta WSF_{12} & \Delta WSF_{13} \\ \Delta WSR_{12} & \Delta WSR_{13} \end{bmatrix} \quad (27)$$

It is assumed that the proportional coefficients Cff and Cfr depend on only an immediately-preceding space length and the proportional coefficients Crf and Crr depend on only an immediately-following space length. Edge shift amounts of the recording pulses are set as an identical value regardless of the immediately-preceding space length and the immediately-following space length. Therefore, it is possible to rewrite the equation as follows.

$$\begin{bmatrix} C\!f\!f(i) & C\!f\!r(i) \\ C\!r\!f(j) & C\!r\!r(j) \end{bmatrix} = \begin{bmatrix} \Delta MepeF_{12}(i) & \Delta MepeF_{13}(i) \\ \Delta MepeR_{12}(j) & \Delta MepeR_{13}(j) \end{bmatrix}$$
$$\begin{bmatrix} \Delta WSF_{12} & \Delta WSF_{13} \\ \Delta WSR_{12} & \Delta WSR_{13} \end{bmatrix} \quad (28)$$

The initial mark edge position errors are calculated by the following equation.

$$\begin{bmatrix} MepeFi(i) \\ MepeRi(j) \end{bmatrix} = \begin{bmatrix} MepeF_1(i) \\ MepeR_1(j) \end{bmatrix} - \begin{bmatrix} C\!f\!f(i) & C\!f\!r(i) \\ C\!r\!f(j) & C\!r\!r(j) \end{bmatrix} \begin{bmatrix} WSF_1 \\ WSR_1 \end{bmatrix} \quad (29)$$

From Equation (25), edge shift amounts of the recording pulses for reducing the front mark edge position error MepeF and the rear mark edge position error MepeR to zero are calculated by the following equation and a write strategy is calculated.

$$\begin{bmatrix} WSF(i,j) \\ WSR(i,j) \end{bmatrix} = - \begin{bmatrix} C\!f\!f(i) & C\!f\!r(i) \\ C\!r\!f(j) & C\!r\!r(j) \end{bmatrix}^{-1} \begin{bmatrix} MepeFi(i) \\ MepeRi(j) \end{bmatrix} \quad (30)$$

As described above, in the third embodiment, when edge shift amounts of the recording pulses do not depend on front and rear space lengths, concerning the mark edge position errors measured in step S306, as indicated by Equation (26), the front mark edge position error MepeF is distinguished by only an immediately-preceding space length and the rear mark edge position error MepeR is distinguished by only an immediately-following space length. Thus, it is possible to simplify means for measuring the mark edge position errors in the mark-edge-position evaluating unit 112.

Kinds of mark edge position errors that should be acquired by executing test recording are approximated as indicated by Equation (25) (the third embodiment) or calculated using Equation (4) (the first embodiment) and calculated using Equation (9) (the second embodiment). These cases are compared.

In the third embodiment, when the kinds ne(k) of mark edge position errors that should be acquired in kth test recording is set as ne3(k), ne3(k) is calculated as follows.

Number of mark edge position errors that should be acquired in each kind of test recording in the third embodiment $$Ne3(k)=\{(Nsf\times 1)+(1\times Nsr)\}=3+3=6 \ (k=1, 2, 3) \quad (31)$$

Then, in the third embodiment, a total number Ne3 of mark edge position errors that should be acquired by executing test recording is calculated as follows.

$$Ne3=\Sigma ne3(k)=6+6+6=18 \quad (32)$$

This means that eighteen kinds of mark edge position errors only have to be measured. Therefore, compared with the first embodiment, the total number of mark edge position errors is reduced by Ne3/Ne1=18/54 times. Compared with the second embodiment, the total number of mark edge position errors is reduced by Ne3/Ne2=18/36. Therefore, it is possible to substantially reduce time for adjusting a write strategy.

Fourth Embodiment

A method of calculating a write strategy according to a fourth embodiment of the invention will be described. Explanations substantially identical with the explanations in the first embodiment are omitted and only differences are described in detail.

In the first to the third embodiments, both the shift amount WSF of the front edge of the recording pulse and the shift amount WSR of the rear edge of the recording pulse are set according to a combination of an immediately-preceding space length and an immediately-following space length (see Equations (4), (9), and (25)). However, in the fourth embodiment, as shown in tables below, the shift amount WSF of a front edge of a recording pulse to be adjusted is distinguished only for the immediately-preceding space length and the shift amount WSR of a rear edge of a recording pulse to be adjusted is distinguished only for the immediately-following space length.

In the step of calculating a write strategy in the first embodiment, the recording-pulse-shift setting unit 120 further shifts the front edge WSF of the recording pulse according to only the immediately-preceding space length and shifts the rear edge WSR of the recording pulse according to only the immediately-following space length.

TABLE 2(a)

Shift amount of a front edge of a recording pulse to be adjusted

| | | Immediately-following space length All Space |
|---|---|---|
| Immediately-preceding space length | 2T Space | WSF(2) |
| | 3T Space | WSF(3) |
| | ≧4T Space | WSF(≧4) |

TABLE 2(b)

Shift amount of a rear edge of a recording pulse to be adjusted

| | | Immediately-following space length | | |
|---|---|---|---|---|
| | | 2T Space | 3T Space | ≧4T Space |
| Immediately-preceding space length | All Space | WSR(2) | WSR(3) | WSR(≧4) |

When distinction of shift amounts of the recording pulse to be adjusted is set as shown in Tables 2(a) and 2(b), a relation between edge shift amounts and mark edge position errors of the recording pulse is represented as follows.

$$MepeF(i,j)=Cff(i,j)*WSF(i)+Cfr(i,j)*WSR(j)+MepeFi(i,j)$$

$$MepeR(i,j)=Crr(i,j)*WSR(j)+Crf(i,j)*WSF(i)+MepeRi(i,j) \quad (33)$$

Note that i indicates an immediately-preceding space length and j indicates an immediately-following space length. Equation (33) is rewritten as a matrix equation as follows.

$$\begin{bmatrix} MepeF(2,2) \\ MepeF(2,3) \\ MepeF(2,4) \\ MepeF(3,2) \\ MepeF(3,3) \\ MepeF(3,4) \\ MepeF(4,2) \\ MepeF(4,3) \\ MepeF(4,4) \\ MepeR(2,2) \\ MepeR(3,2) \\ MepeR(4,2) \\ MepeR(2,3) \\ MepeR(3,3) \\ MepeR(4,3) \\ MepeR(2,4) \\ MepeR(3,4) \\ MepeR(4,4) \end{bmatrix} = \begin{bmatrix} Cff(2,2) & & & Cfr(2,2) & & \\ Cff(2,3) & & & & Cfr(2,3) & \\ Cff(2,4) & & & & & Cfr(2,4) \\ & Cff(3,2) & & Cfr(3,2) & & \\ & Cff(3,3) & & & Cfr(3,3) & \\ & Cff(3,4) & & & & Cfr(3,4) \\ & & Cff(4,2) & Cfr(4,2) & & \\ & & Cff(4,3) & & Cfr(4,3) & \\ & & Cff(4,4) & & & Cfr(4,4) \\ Crf(2,2) & & & Crr(2,2) & & \\ & Crf(3,2) & & Crr(3,2) & & \\ & & Crf(4,2) & Crr(4,2) & & \\ Crf(2,3) & & & & Crr(2,3) & \\ & Crf(3,3) & & & Crr(3,3) & \\ & & Crf(4,3) & & Crr(4,3) & \\ Crf(2,4) & & & & & Crr(2,4) \\ & Crf(3,4) & & & & Crr(3,4) \\ & & Crf(4,4) & & & Crr(4,4) \end{bmatrix} \begin{bmatrix} WSF(2) \\ WSF(3) \\ WSF(4) \\ WSR(2) \\ WSR(3) \\ WSR(4) \end{bmatrix} + \begin{bmatrix} MepeFi(2,2) \\ MepeFi(2,3) \\ MepeFi(2,4) \\ MepeFi(3,2) \\ MepeFi(3,3) \\ MepeFi(3,4) \\ MepeFi(4,2) \\ MepeFi(4,3) \\ MepeFi(4,4) \\ MepeRi(2,2) \\ MepeRi(3,2) \\ MepeRi(4,2) \\ MepeRi(2,3) \\ MepeRi(3,3) \\ MepeRi(4,3) \\ MepeRi(2,4) \\ MepeRi(3,4) \\ MepeRi(4,4) \end{bmatrix} \quad (34)$$

Portions in which matrix elements are zero are shown as blanks. The representation of 4 included in arguments of respective elements means $\geq 4$ (e.g., Cff(2,4)=Cff(2,$\geq$4)).

Matrixes and vectors included in Equation (34) are defined as follows.

$$Mepe = \begin{bmatrix} MepeF(2,2) \\ MepeF(2,3) \\ MepeF(2,4) \\ MepeF(3,2) \\ MepeF(3,3) \\ MepeF(3,4) \\ MepeF(4,2) \\ MepeF(4,3) \\ MepeF(4,4) \\ MepeR(2,2) \\ MepeR(3,2) \\ MepeR(4,2) \\ MepeR(2,3) \\ MepeR(3,3) \\ MepeR(4,3) \\ MepeR(2,4) \\ MepeR(3,4) \\ MepeR(4,4) \end{bmatrix}, Mepei = \begin{bmatrix} MepeFi(2,2) \\ MepeFi(2,3) \\ MepeFi(2,4) \\ MepeFi(3,2) \\ MepeFi(3,3) \\ MepeFi(3,4) \\ MepeFi(4,2) \\ MepeFi(4,3) \\ MepeFi(4,4) \\ MepeRi(2,2) \\ MepeRi(3,2) \\ MepeRi(4,2) \\ MepeRi(2,3) \\ MepeRi(3,3) \\ MepeRi(4,3) \\ MepeRi(2,4) \\ MepeRi(3,4) \\ MepeRi(4,4) \end{bmatrix},$$ (35)

$C =$ $$\begin{bmatrix} Cff(2,2) & & & Cfr(2,2) & & \\ Cff(2,3) & & & & Cfr(2,3) & \\ Cff(2,4) & & & & & Cfr(2,4) \\ & Cff(3,2) & & Cfr(3,2) & & \\ & Cff(3,3) & & & Cfr(3,3) & \\ & Cff(3,4) & & & & Cfr(3,4) \\ & & Cff(4,2) & Cfr(4,2) & & \\ & & Cff(4,3) & & Cfr(4,3) & \\ & & Cff(4,4) & & & Cfr(4,4) \\ Crf(2,2) & & & Crr(2,2) & & \\ & Crf(3,2) & & Crr(3,2) & & \\ & & Crf(4,2) & Crr(4,2) & & \\ Crf(2,3) & & & & Crr(2,3) & \\ & Crf(3,3) & & & Crr(3,3) & \\ & & Crf(4,3) & & Crr(4,3) & \\ Crf(2,4) & & & & & Crr(2,4) \\ & Crf(3,4) & & & & Crr(3,4) \\ & & Crf(4,4) & & & Crr(4,4) \end{bmatrix},$$

$$w = \begin{bmatrix} WSF(2) \\ WSF(3) \\ WSF(4) \\ WSR(2) \\ WSR(3) \\ WSR(4) \end{bmatrix}$$

When the representation of Equation (35) is used, Equation (34) is represented as follows.

$$Mepe = Cw + Mepei \qquad (36)$$

Respective elements of a matrix C in Equation (36) representing sensitivities of mark edge position errors with respect to edge shift amounts of the recording pulse are calculated on the basis of measurement values of mark edge position errors acquired by executing test recording as in the first embodiment (see Equation (5)).

A method of calculating an optimum write strategy using the matrix C in Equation (36) will be described. For all combinations of immediately-preceding space lengths and immediately-following space lengths to be considered, an evaluation function $E_{Mepe}$ indicating a square sum of the front mark edge position error MepeF and the rear mark edge position error MepeR is defined as follows.

$$E_{Mepe} = \Sigma(MepeF(i,j)^2 + MepeR(i,j)^2) \qquad (37)$$

Then, a vector $w_0$ having an edge shift amount of the recording pulse for minimizing the evaluation function is calculated by the following equation and an optimum write strategy is calculated.

$$w_0 = -C^\# Mepei \qquad (38)$$

$C^\#$ in Equation (38) represents a pseudo-inverse matrix of the matrix C in Equation (36). $\Sigma$ in Equation (37) means a sum of all combinations (i,j) of front and rear space lengths to be considered.

As described above, it is possible to calculate an edge shift amount of the recording pulse for minimizing the evaluation function $E_{Mepe}$ defined in Equation (37) and calculate an optimum write strategy. In actually recording information, deviation of appearance frequency corresponding to a pattern may occur. For example, combinations of specific front and rear space lengths often appear. In such a case, it is possible to calculate a more suitable write strategy by adjusting edge shift amounts of the recording pulse taking into account the appearance frequency or the like.

Specifically, an edge shift amount of the recording pulse for minimizing the following evaluation function indicating a weighted square sum of mark edge position errors instead of the evaluation function indicating a square sum of mark edge position errors indicated by Equation (37) is calculated.

$$E_{Mepe} = \Sigma\{(Wf(i,j) \cdot MepeF(i,j))^2 + (Wr(i,j) \cdot MepeR(i,j))^2\} \qquad (39)$$

As in Equation (38), a vector $w_0$ having an edge shift amount of the recording pulse for minimizing the evaluation function is calculated by the following equation.

$$w_0 = -(RC)^\# R \, Mepei \qquad (40)$$

Wf and Wr in Equation (39) represent weighting coefficients and a matrix R in Equation (40) is a weighting matrix represented as follows.

$$R = \text{diag}(R_1, R_2, \ldots, R_{18}) \qquad (41)$$

where, $R_1 = Wf_{(2,2)}$, $R_2 = Wf_{(2,3)}$, $R_3 = Wf_{(2,4)}$, $R_4 = Wf_{(3,2)}$, $R_5 = Wf_{(3,3)}$, $R_6 = Wf_{(3,4)}$, $R_7 = Wf_{(4,2)}$, $R_8 = Wf_{(4,3)}$, $R_9 = Wf_{(4,4)}$, $R_{10} = Wr_{(2,2)}$, $R_{11} = Wr_{(3,2)}$, $R_{12} = Wr_{(4,2)}$, $R_{13} = Wr_{(2,3)}$, $R_{14} = Wr_{(3,3)}$, $R_{15} = Wr_{(4,3)}$, $R_{16} = Wr_{(2,4)}$, $R_{17} = Wr_{(3,4)}$, $R_{18} = Wr_{(4,4)}$, provided that $(RC)^\#$ represents a pseudo-inverse matrix of the matrix (RC).

As described above, in a situation in which there is a distribution in appearance frequency according to a pattern, it is possible to calculate a suitable edge shift amount of the recording pulse according to Equation (40) by using a predetermined weighting matrix and calculate an optimum write strategy.

Fifth Embodiment

A method of calculating a write strategy according to a fifth embodiment of the invention will be described.

Explanations substantially identical with the explanations in the first to the fourth embodiments are omitted and only differences are described in detail.

According to the fifth embodiment, in the fourth embodiment, the sensitivities Cff and Cfr of the front mark edge position error MepeF with respect to the edge shift amounts WSF and WSR of the recording pulse are not affected by a difference in an immediately-following space length and the sensitivities Crf and Crr of the rear mark edge position error MepeR with respect to the edge shift amounts WSF and WSR of the recording pulse are not affected by a difference in an immediately-preceding space length.

In the step of calculating a write strategy in the fourth embodiment, the sensitivity calculating unit 116 further calculates the respective sensitivities assuming that the proportional coefficients Cff and Cfr included in the first linear function depend on only an immediately-preceding space length and the proportional coefficients Crf and Crr included in the second linear function MepeR depend on only an immediately-following space length.

In this case, unknown numbers of the matrix C in Equation (36) decreases and is represented as follows.

$$C = \begin{bmatrix} Cff(2) & & & & Cfr(2) & & \\ Cff(2) & & & & & Cfr(2) & \\ Cff(2) & & & & & & Cfr(2) \\ & Cff(3) & & Cfr(3) & & & \\ & Cff(3) & & & Cfr(3) & & \\ & Cff(3) & & & & Cfr(3) & \\ & & Cff(4) & Cfr(4) & & & \\ & & Cff(4) & & Cfr(4) & & \\ & & Cff(4) & & & Cfr(4) & \\ Crf(2) & & & Crr(2) & & & \\ Crf(2) & & & & Crr(2) & & \\ Crf(2) & & & & & Crr(2) & \\ & Crf(3) & & & & & Crr(3) \\ & Crf(3) & & & & Crr(3) & \\ & & Crf(3) & & & Crr(3) & \\ Crf(4) & & & & & & Crr(4) \\ & Crf(4) & & & & & Crr(4) \\ & & Crf(4) & & & & Crr(4) \end{bmatrix} \quad (42)$$

As a result, in order to calculate the respective element of the matrix C and the initial value vector Mepei, it is possible to reduce the number of patterns of a write strategy for which test recording should be performed and reduce time for adjusting edge shift amounts of the recording pulse. A method of calculating the matrix C and the initial value vector Mepei of mark edge position errors is the same as that in the second embodiment. A method of calculating edge shift amounts of the recording pulse on the basis of the matrix C and the initial value vector Mepei of the mark edge position errors calculated (see Equations (38) and (40)) is the same as that in the fourth embodiment.

Sixth Embodiment

A method of calculating a write strategy according to a sixth embodiment of the invention will be described. Explanations substantially identical with the explanations in the first to the fifth embodiments are omitted and only differences are described in detail.

In the sixth embodiment, in addition to the conditions described in the fifth embodiment, it is assumed that the initial front mark edge position error MepeFi does not depend on an immediately-following space length and the initial rear mark edge position error MepeRi does not depend on an immediately-preceding space length.

In the step of calculating a write strategy in the fourth embodiment, the sensitivity calculating unit 116 further calculates respective sensitivities assuming that the initial front mark edge position error MepeFi of the initial front mark edge position error MepeFi and the initial rear mark edge position error MepeRi does not depend on an immediately-following space length and the initial rear mark edge position error MepeRi does not depend on an immediately-preceding space length and assuming that the proportional coefficients Cff and Cfr included in the first linear function do not depend on the immediately-following space length and the proportional coefficients Crf and Crr included in the second linear function do not depend on the immediately-preceding space length.

In this case, the matrix C and the vector Mepei in Equation (36) are represented by the following equation.

$$C = \begin{bmatrix} Cff(2) & & Cfr(2) & & \\ Cff(2) & & & Cfr(2) & \\ Cff(2) & & & & Cfr(2) \\ Cff(3) & & Cfr(3) & & \\ Cff(3) & & & Cfr(3) & \\ Cff(3) & & & & Cfr(3) \\ Cff(4) & Cfr(4) & & & \\ Cff(4) & & Cfr(4) & & \\ Cff(4) & & & Cfr(4) & \\ Crf(2) & & Crr(2) & & \\ Crf(2) & & & Crr(2) & \\ Crf(2) & Crr(2) & & & \\ Crf(3) & & & Crr(3) & \\ Crf(3) & & & Crr(3) & \\ Crf(3) & & & Crr(3) & \\ Crf(4) & & & & Crr(4) \\ Crf(4) & & & & Crr(4) \\ Crf(4) & & & & Crr(4) \end{bmatrix}, \quad (43)$$

$$Mepei = \begin{bmatrix} MepeFi(2) \\ MepeFi(2) \\ MepeFi(2) \\ MepeFi(3) \\ MepeFi(3) \\ MepeFi(3) \\ MepeFi(4) \\ MepeFi(4) \\ MepeFi(4) \\ MepeRi(2) \\ MepeRi(2) \\ MepeRi(2) \\ MepeRi(3) \\ MepeRi(3) \\ MepeRi(3) \\ MepeRi(4) \\ MepeRi(4) \\ MepeRi(4) \end{bmatrix}$$

Compared with the case of the fifth embodiment, the number of classifications of the initial mark edge position errors MepeFi and MepeRi decreases. As a result, it is possible to reduce kinds of mark edge position errors acquired by executing test recording and reduce time for adjusting edge shift amounts of the recording pulse.

In the sixth embodiment, compared with the fourth embodiment, it is possible to simplify the mark-edge-position evaluating unit. As described above in the third embodiment (see Equations (33) and (34)), it is unnecessary to distinguish the front mark edge position error MepeF with an immediately-following space length and distinguish the rear mark edge position error MepeR with an immediately-preceding space length at the time of calculation of the matrix C and the initial value vector Mepei of the mark edge position errors. Thus, it is possible to simplify the mark-edge-position evaluating unit. A method of calculating the matrix C and the initial value vector Mepei of the mark edge position errors is the same as that in the third embodiment. A method of calculating edge shift amounts of the recording pulse on the basis of the matrix C and the initial vector Mepei of the mark edge position errors calculated (see Equations (38) and (40)) is the same as that in the fourth embodiment.

A Method of Acquiring Mark Edge Position Errors

A method of acquiring mark edge position errors will be explained citing a specific example. It goes without saying that a method of acquiring mark edge position errors according to this embodiment is not limited to the example described below and may be any method as long as a difference between an ideal mark edge position and a mark edge position actually recorded is detected.

As an example, there is a method of calculating a shift amount of a front mark edge and a shift amount of a rear mark edge from comparison of a cross point between a reproduction waveform and a slice level and a PLL clock signal and calculating mark edge position errors on the basis of the shift amounts calculated. A pattern (a combination of a space length and a mark length) in which shift less easily occurs is referred to as a reference patter and a pattern for which adjustment is performed is referred to as an adjustment pattern. The mark edge position errors according to this method are obtained by calculating a difference between the shift amount of the adjustment pattern and the shift amount of the reference pattern. Such a method is suitable for obtaining a recording condition for realizing a reproduction signal quality with a low error ratio in a binary slice reproduction system.

As another example, there is a method of calculating a difference metric (concerning "difference metric", see Japanese Patent No. 3674160) indicating likelihood of a reproduction sequence obtained as a result of maximum likelihood decoding, calculating a difference between the difference metric calculated and an ideal value of a difference metric as a difference metric error, and classifying and compiling the difference metric error according to front and rear space lengths and an own mark length to obtain an evaluation value. Since the evaluation value is equivalent to shift amounts of mark edges, the mark edge position errors are calculated by evaluating a difference between an evaluation value of the adjustment pattern and an evaluation value of the reference pattern. Such a method is suitable for obtaining a recording condition for realizing a reproduction signal quality with a low error ratio in an information recording and reproducing apparatus that detects recording information according to the maximum likelihood decoding system.

In the explanations of the respective embodiments, in calculating sensitivities, the respective sensitivities and the initial mark edge position errors are calculated on the basis of the mark edge position errors measured by test recording. However, the optical recording and reproducing apparatus according to the embodiments of the invention is not limited to this. For example, the initial mark edge position errors may be measured by test recording.

The invention is not limited to the embodiments described above. For example, it is possible to combine the first to the sixth embodiments as appropriate. Specifically, for example, for a pattern with large front and rear space lengths, approximation that a sensitivity included in the first linear function does not depend on an immediately-following space length and a sensitivity included in the second linear function does not depend on an immediately-preceding space length is used and, on the other hand, for a pattern with small front and rear space lengths, respective parameters are distinguished by the front and rear space lengths. More specifically, for example, only when front and rear space lengths substantially affected by thermal interference are 2T, the respective parameters are distinguished according to the front and rear space lengths as in the first embodiment and, in other cases, the approximation described in the second embodiment is carried out.

In the explanations of the embodiments, an operation for correcting a write strategy is performed once. However, it is also possible to carry out adjustment of a write strategy again with a write strategy adjusted is set as an initial strategy. By repeating adjustment work plural times, it is possible to calculate a write strategy with which it is possible to execute more accurate recording.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical recording and reproducing apparatus that records information according to a front edge and a rear edge of a mark formed on one side of a recording medium in which the information is recorded by a laser, the optical recording and reproducing apparatus comprising:

a recording-pulse-shift setting unit that shifts a front edge and a rear edge of a recording pulse, which is a recording waveform of the laser, according to an immediately-preceding space length between one mark and another mark located immediately in front of the one mark and an immediately-following space length between the one mark and another mark located immediately behind the one mark, and that sets a write strategy of the recording pulse;

a mark-edge-position evaluating unit that detects a front edge and a rear edge of a mark formed on the basis of the write strategy and detects a front mark edge position error, which is a position error of the front edge of the mark, and a rear mark edge position error, which is a position error of the rear edge of the mark;

an assuming unit that assumes that the front mark edge position error is represented by a first linear function having a shift amount of the front edge of the recording pulse and a shift amount of the rear edge of the recording pulse as variables and assumes that the rear mark edge position error is represented by a second linear function having the shift amount of the front edge of the recording pulse and the shift amount of the rear edge of the recording pulse as variables;

a sensitivity calculating unit that executes test recording for each of combinations of immediately-preceding space lengths and immediately-following space lengths and then calculates sensitivities represented as respective proportional coefficients included in the first linear function and the second linear function according to the front mark edge position error and the rear mark edge position error detected by the mark-edge-position evaluating unit; and a write-strategy calculating unit that calculates a write strategy of the recording pulse on the basis of the sensitivities, wherein the sensitivity calculating unit calculates the sensitivities assuming that the sensitivity represented by the proportional coefficient included in the first linear function depends on only the immediately-preceding space length and the sensitivity represented by the proportional coefficient included in the second linear function depends on only the immediately-following space length.

* * * * *